Sept. 21, 1954  C. H. JOHNSON  2,689,498
ROTARY TOOL TURNING

Filed Feb. 6, 1950  3 Sheets-Sheet 1

INVENTOR
Charles H. Johnson
BY
ATTORNEYS.

Sept. 21, 1954   C. H. JOHNSON   2,689,498
ROTARY TOOL TURNING
Filed Feb. 6, 1950   3 Sheets-Sheet 2

INVENTOR
Charles H. Johnson
BY
ATTORNEYS.

Sept. 21, 1954  C. H. JOHNSON  2,689,498
ROTARY TOOL TURNING
Filed Feb. 6, 1950  3 Sheets-Sheet 3
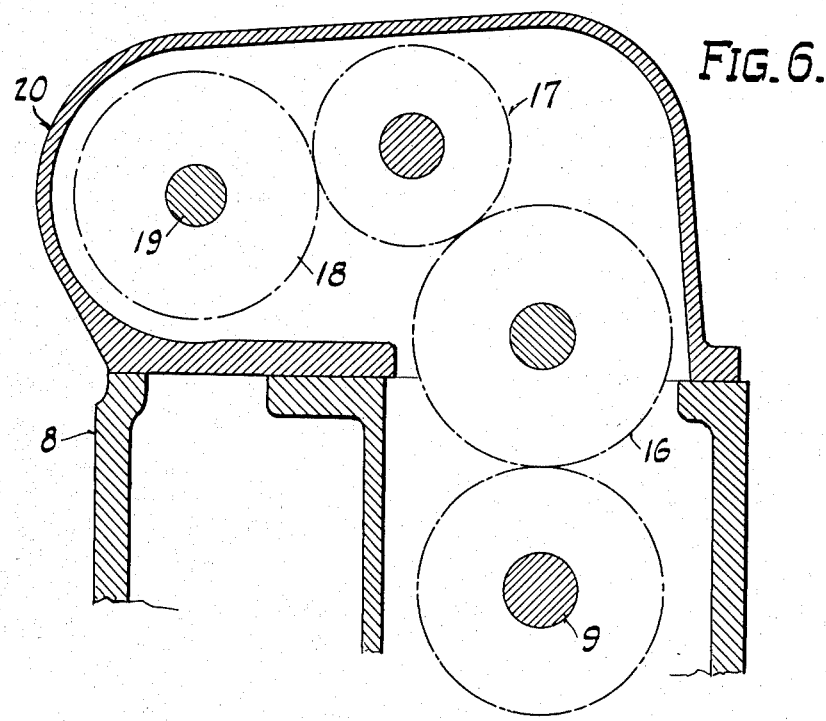
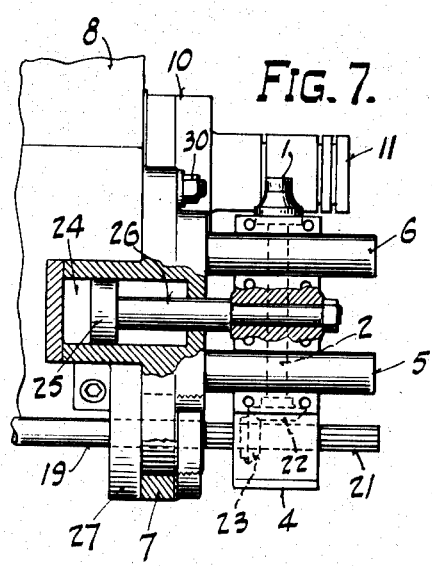
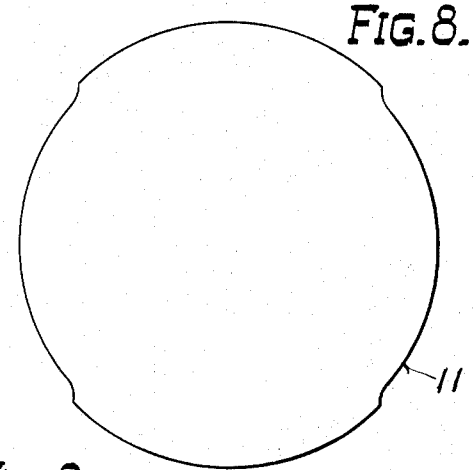
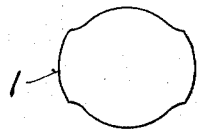
INVENTOR
Charles H. Johnson
BY
ATTORNEYS.

Patented Sept. 21, 1954

2,689,498

UNITED STATES PATENT OFFICE 2,689,498

ROTARY TOOL TURNING

Charles H. Johnson, Madison, Wis., assignor to Gisholt Machine Company, Madison, Wis., a corporation of Wisconsin Application February 6, 1950, Serial No. 142,560

1 Claim. (Cl. 82—18)

This invention relates to rotary tool turning and provides a longer-life tool and a very fast method of turning workpieces in lathes to contours other than circular.

Heretofore, for instance, in turning the outer skirt of engine pistons where it is desirable to have a few thousandths of an inch relief on the sides corresponding to the ends of the wrist pin, it has been customary to reciprocate the cutting tool radially of the axis of turning and in synchronism with the rotation of the workpiece. This practice has required the use of cams and cam rollers which are difficult to maintain accurate; and in addition, the masses involved have made it impractical to utilize speeds greater than about 1200 R. P. M. for the workpiece or 2400 reciprocations per minute for the tool.

The present invention, when applied to the turning of piston skirts has entirely removed the difficulties previously encountered and has more than doubled the speed, making it possible for a single lathe to produce substantially more than has ever been thought possible before.

The principal object of the present invention is to greatly increase the speed of contour turning in lathes.

Another object of the invention is to eliminate the vibration entailed in prior tool reciprocation employed in previous methods of contour turning.

Another object is to provide a more balanced tool movement in contour turning.

Another object is to spread the wear on a tool over a substantial area and to more readily cool the cutting edge whereby tools have a substantially greater life.

According to the invention a rotary cutting tool is employed having a patterned periphery which is the converse of the shape desired in the article being turned whereby synchronous rotation of the tool and workpiece will produce the desired contour turning effect. The tool is disposed with its axis of rotation substantially at right angles to the longitudinal axial plane of the workpiece containing the radius at the point of cut.

Where the ratio of rotation of the tool and workpiece is one-to-one (1:1) the patterns of the two are the exact converse except for the fact that the diameter or size of the tool is generally smaller. Where some other ratio of rotation is employed, the tool pattern should be correspondingly different to produce the desired pattern in the work.

The invention may be employed to turn oval workpieces or various other non-cylindrical patterns in a workpiece.

The invention is illustrated in the accompanying drawing in which:

Fig. 6 is a vertical sectional view taken on line 6—6 of Fig. 3 and showing the drive gearing in the headstock;

Fig. 7 is a detail broken section showing the slideways and hydraulic feed for the tool;

Fig. 8 is a schematic illustration of a typical contour to be turned from a rough cylinder and with the contour curves exaggerated; and Fig. 9 is a similar illustration of a tool for contour turning the piece illustrated in Fig. 8 on a one-to-one (1:1) rotational ratio and with the contour curves exaggerated.

Figure 1:
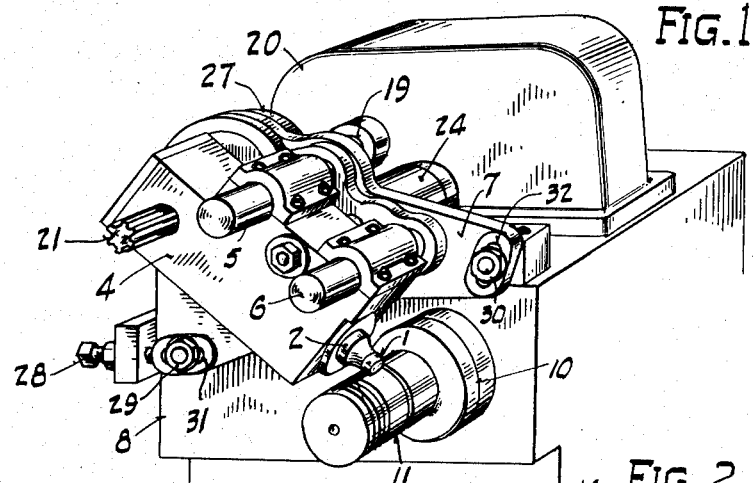
Figure 1 is a perspective view of a part of a lathe showing the present method of contour turning.

As stated above the invention employs a rotary tool 1 of tungsten carbide or the like having a smooth end face and a cutting edge patterned in accordance with the contour to be turned.

In the drawing the tool 1 is shown mounted on a tool spindle 2 disposed in suitable anti-friction bearings 3 in a tool slide 4.

The slide 4 is mounted on two cylindrical guide rods 5 and 6 extending from an adjustable support plate 7 mounted on the front of the headstock 8. The rods 5 and 6 extend in a direction parallel to the work spindle 9.

The spindle 9 is shown as having a chuck 10 holding an engine piston 11 to be contour turned. The piston 11 is shown with the usual circumferential grooves for receiving piston rings and which grooves may be turned simultaneously with the contour turning of the piston, by using the usual groove-cutting tools 12 mounted on the tool carriage 13 and cross slide 14 of the lathe.

The work 11 is centered against cutting forces by means of the chuck 10 and the tailstock 15.

Figure 2:
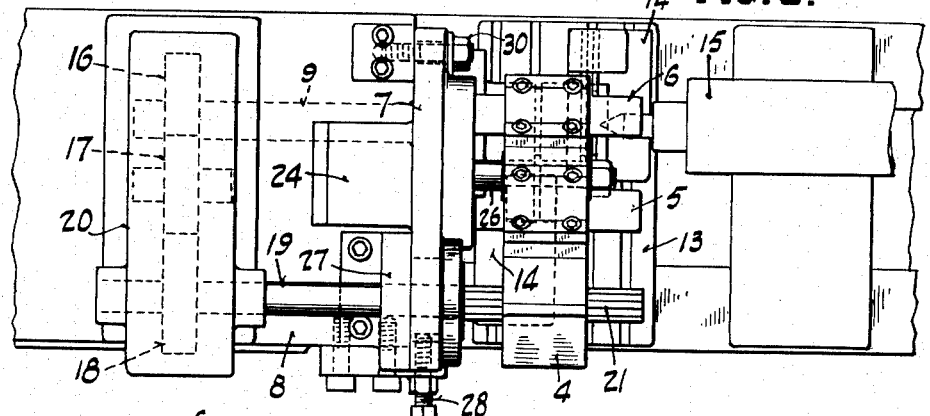
Fig. 2 is a top plan view of the same part showing the contour turning attachment.
Figure 3:
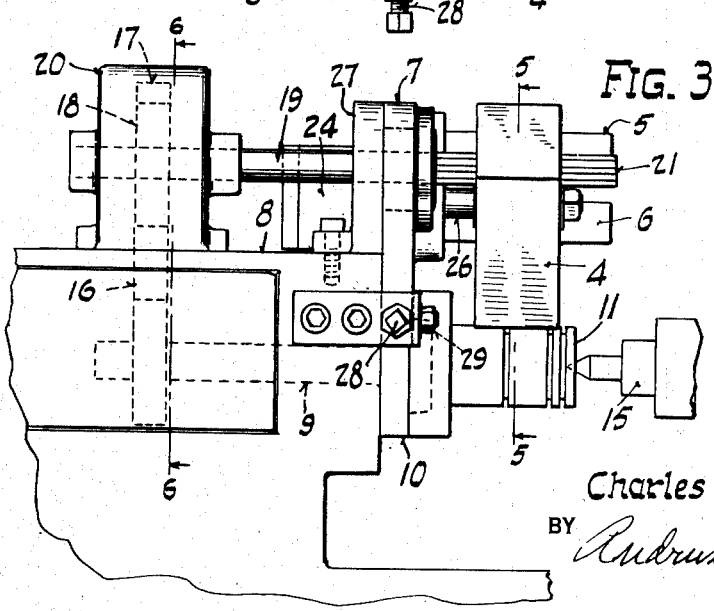
Fig. 3 is a front elevation of the same parts.
Figure 4:
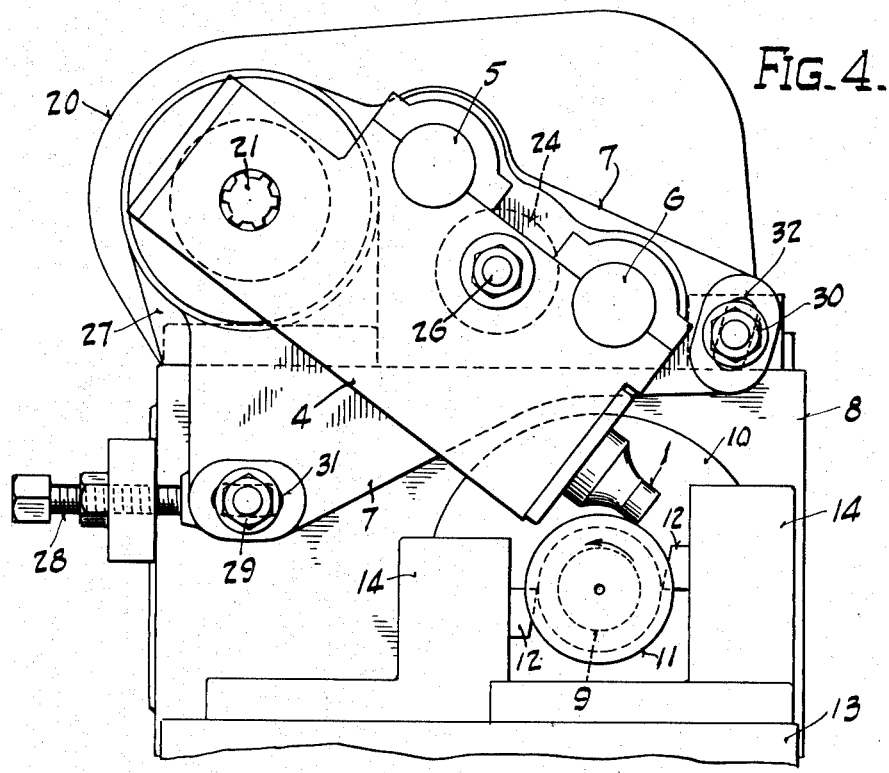
Fig. 4 is an end view of the parts looking toward the headstock and with parts in section.
Figure 5:
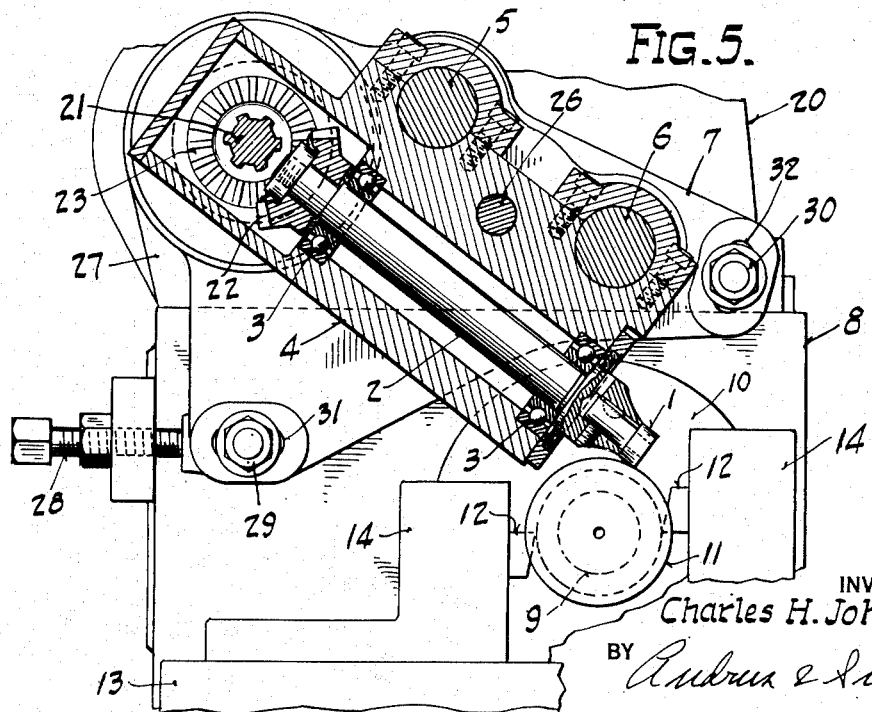
Fig. 5 is a vertical sectional view taken on the axis of the tool on line 5—5 of Fig. 3.

The drive for the tool spindle 2 is direct from the headstock 8, as shown in Figs. 2, 5 and 6. For this purpose the work spindle 9 in the headstock 8 drives, by means of suitable gearing 16, 17 and 18, a tool drive shaft 19 which extends parallel to the work spindle 9 and through the front end of a housing 20 mounted on the headstock.

The tool drive shaft 19 has a splined outer end 21 which extends through the support plate 7 and tool slide 4 near the end of the tool spindle 2 and at right angles thereto.

The tool spindle 2 is driven by means of a beveled gear 22 secured to its end and which meshes with a corresponding drive bevel gear 23 splined on portion 21 of shaft 19.

The tool slide 4 is reciprocated on guide rods 5 and 6 to traverse and feed tool 1 to the work, by means of a hydraulic cylinder 24 and piston 25 disposed intermediate the guide rods on support plate 7. The piston 25 has a piston rod 26 extending outwardly parallel to guide rods 5 and 6 with its outer end secured to slide 4.

Fluid pressure operation of piston 25 in cylinder 24 effects the desired predetermined feed and traverse movements for tool 1 axially of the piston workpiece 11.

The tool 1 may be adjusted toward or away from the axis of rotation of the workpiece 11 by adjustment of the mounting plate 7 on the headstock 8.

For this purpose the plate 7 is constructed to pivot on a flanged bracket 27 mounted on headstock 8 with its flange concentric with the tool drive shaft 19. An adjusting screw 28 is threaded horizontally through a lug on the front of headstock 8 to engage the lower tip of plate 7 and thereby determine the rotational position of plate 7 on the flange 27.

The plate 7 is clamped to the headstock 8 in any predetermined position of adjustment by means of two clamp bolts 29 and 30. The bolts 29 and 30 pass through corresponding slots 31 and 32, respectively, in plate 7, the slots being curved concentric to the axis of shaft 19 to accommodate rotational adjustment of mounting plate 7 when bolts 29 and 30 are loosened. When bolts 29 and 30 are tightened to clamp the plate 7 between the bolt heads and the headstock, the plate is secured in place for operation of tool 1.

The tool 1 should be so positioned with respect to the workpiece that it makes its cut at or trailing the radius of the workpiece that is normal to the axis of the tool. For this purpose the plane of the end face of the cutting tool should be disposed to contain the axis of the workpiece.

The illustration shows the contour turning of a piston 11 in which it is desired to have the relief contours indicated diagrammatically in Fig. 8 wherein the opposite sides of the piston have a relief of approximately fifteen thousandths (.015″) of an inch for about a quadrant and the curvature approaching each relief quadrant has a gradual relief from the maximum diameter or major axis of the piston, as indicated in exaggeration on the drawing.

Figure 9 illustrates in exaggeration the contour of a tool 1 capable of turning the piston illustrated in Fig. 8.

The tool 1 may be rotated in either direction during contour turning, but the tool should be so positioned as to have the work rotate toward the same to effect the desired cutting action.

By reason of the fact that the tool rotates, the cutting point of the tool at each successive instant is changing, thereby relieving the cutting action from any given sector of the tool almost immediately after making its cut. This progressive movement of the cutting action around the periphery of the tool provides a cooling time for each sector of the cutting edge and distributes the wear over a substantial area, so that the tool has a much greater life.

It is possible to take advantage of this constant progressive changing of the cutting edge in the turning of cylindrical workpieces, by employing a circular tool.

The tool 1 may be redressed or sharpened by grinding the end face thereof.

The tool 1 is substantially balanced in its rotation so that high-speed rotation will not cause undue vibration, and it is possible to cut at very high rotational speeds.

The feed of the tool longitudinally of the workpiece should be at a rate resulting in the desired smoothness of contour having regard to the relatively small cut obtainable with a rotating tool. If necessary, the workpiece should be pre-machined cylindrically to a diameter close to the final major diameter.

The invention may be employed in various turning operations and may be carried out with various apparatus constituting the support and drive for the tool.

Various embodiments of the invention may be employed within the scope of the accompanying claim.

I claim:

A lathe comprising a work spindle, a tool spindle having its axis in a plane substantially perpendicular to the axis of said work spindle, a rotary cutting tool carried by said tool spindle and having a substantially continuous non-circular cutting edge lying in a plane perpendicular to said tool spindle axis so that rotation of said tool spindle will feed said edge into cutting relation with the work to take varying depths of cut during each rotation of said tool spindle, the peripheral contour of said cutting edge including a reverse replica of the desired peripheral shape of the workpiece, and a common drive for said spindles for rotating said tool spindle in such relation with respect to the rotation of said work spindle so that said replica is fed past the workpiece to reproduce its contour thereon.

References Cited in the file of this patent

UNITED STATES PATENTS

| Number | Name | Date |
| --- | --- | --- |
| 253,314 | Richmann | Feb. 7, 1882 |
| 662,188 | Cornelis | Nov. 20, 1900 |
| 1,722,600 | Thacher | July 30, 1929 |
| 1,761,768 | Auguste | June 3, 1930 |
| 2,008,474 | Smith | July 16, 1935 |
| 2,233,398 | Carlin | Mar. 4, 1941 |
| 2,233,399 | Carlin | Mar. 4, 1941 |
| 2,292,720 | Spence | Aug. 11, 1942 |
| 2,530,550 | Staples | Nov. 21, 1950 |